United States Patent
Chou

(10) Patent No.: US 8,305,437 B2
(45) Date of Patent: Nov. 6, 2012

(54) OPTICAL FIBER SECURITY SYSTEM

(75) Inventor: Huitsuo Chou, Hsinchu (TW)

(73) Assignee: Ming-Feng Ho, Hsinchu (TW)

( * ) Notice: Subject to any disclaimer, the term of this patent is extended or adjusted under 35 U.S.C. 154(b) by 1128 days.

(21) Appl. No.: 12/186,220

(22) Filed: Aug. 5, 2008

(65) Prior Publication Data

US 2009/0040304 A1 Feb. 12, 2009

(30) Foreign Application Priority Data

Aug. 6, 2007 (TW) ................... 96128904 A

(51) Int. Cl.
*H04N 7/18* (2006.01)
(52) U.S. Cl. ....................... 348/143; 348/159
(58) Field of Classification Search .................... 348/143
See application file for complete search history.

(56) References Cited

U.S. PATENT DOCUMENTS

| | | | |
|---|---|---|---|
| 5,008,934 A * | 4/1991 | Endoh | 380/221 |
| 5,278,687 A | 1/1994 | Jannson et al. | |
| 5,541,757 A | 7/1996 | Fuse et al. | |
| 5,701,186 A | 12/1997 | Huber | |
| 6,996,344 B1 | 2/2006 | Caidar et al. | |
| 2007/0015485 A1* | 1/2007 | DeBiasio et al. | 455/345 |
| 2007/0256105 A1* | 11/2007 | Tabe | 725/78 |

* cited by examiner

*Primary Examiner* — Wing F Chan
*Assistant Examiner* — Andrew Woo
(74) *Attorney, Agent, or Firm* — Morris Manning & Martin LLP; Tim Tingkang Xia, Esq.

(57) ABSTRACT

An optical fiber security system is described. The optical fiber security system includes an optical fiber, an optoelectronic modulator and an optoelectronic demodulator. The optoelectronic modulator and the optoelectronic demodulator are both directly connected to the optical fiber. The optoelectronic modulator converts video signals to cable television video signals and subsequently converts to optical signals. The optical signals are transmitted to the optoelectronic demodulator through the optical fiber. The optoelectronic demodulator further reverses the optical signals back to the video signals to remotely monitor the environment.

14 Claims, 1 Drawing Sheet

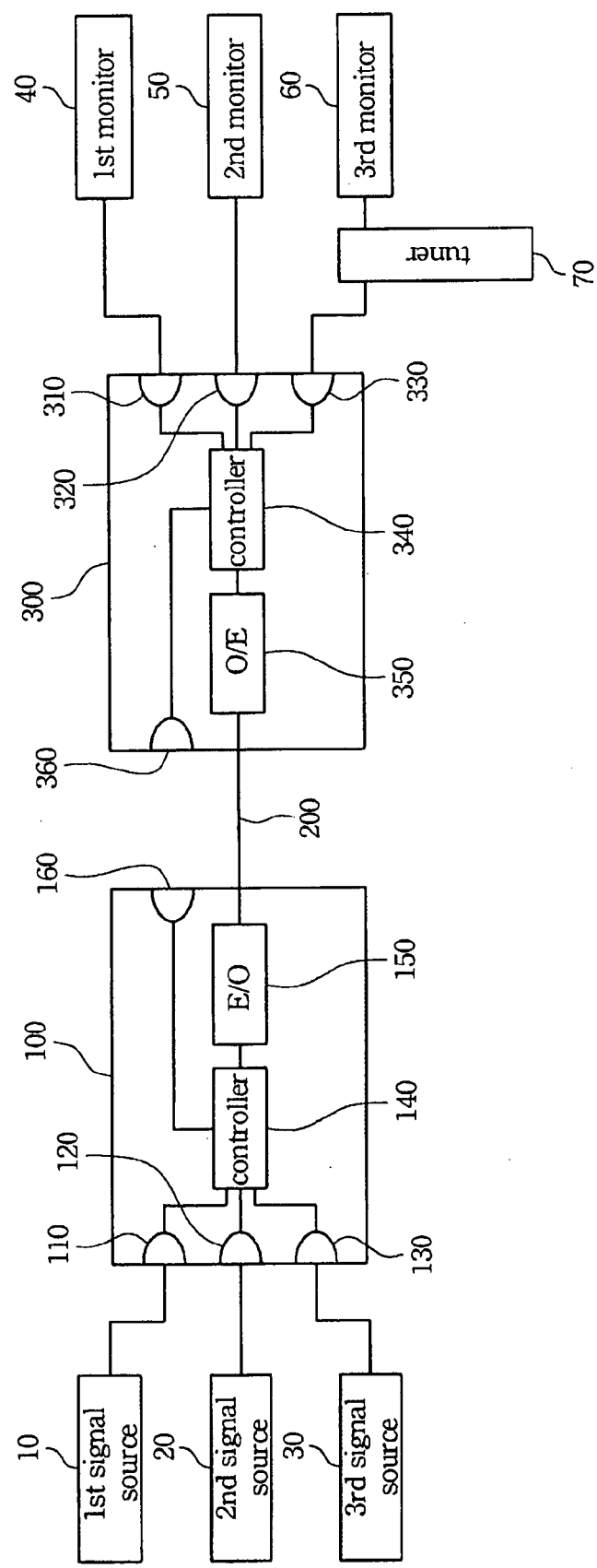

OPTICAL FIBER SECURITY SYSTEM

RELATED APPLICATIONS

The present application is based on, and claims priority from, Taiwan Application Serial Number 96128904, filed Aug. 6, 2007, which is herein incorporated by reference.

FIELD OF THE INVENTION

The present invention generally relates to an optical fiber security system. More particularly, this invention relates to a closed high bandwidth optical fiber security system.

BACKGROUND OF THE INVENTION

People are becoming increasingly concerned about safety issues including personal safety, burglary and traffic accidents. To reduce the damage caused by these kinds of public safety issues, a video based monitoring systems are popularly used to instantaneously monitor and review abnormal events.

The monitoring system can save both audio and visual data and therefore acts as a deterrent against those who would cause bodily harm, burgle a home are drive a vehicle dangerously thereby improving the overall safety of the general public. Therefore, the fact can be easily understood even when each of the interested parties sticks to his own argument. Accordingly, the instantaneous monitoring function and the identification accuracy of the monitoring system are very important. However, most of the conventional monitoring systems use coaxial cables to transmit video signals. Hence, the transmission distance of the conventional monitoring system is limited. Otherwise, the coaxial cables have to be configured through many signal amplifiers to enlarge the transmission distance. Therefore, the cost of the conventional monitoring system is increased. In addition, if the video signals transmitted by the public network, such as Internet, the video quality has to be downgraded to match the transmittable bandwidth in the public network.

SUMMARY OF THE INVENTION

One objective of the present invention is to provide an optical fiber security system to effectively extend the transmission distance thereof.

Another objective of the present invention is to provide an optical fiber security system to easily control and adjust the video channel thereof with local control signals or remote control signals.

To achieve these and other advantages and in accordance with the objective of the present invention, as the embodiment broadly describes herein, the present invention provides an optical fiber security system including an optical fiber, an optoelectronic modulator and an optoelectronic demodulator. Both the optoelectronic modulator and the optoelectronic demodulator are directly connected to the optical fiber. The optoelectronic modulator further includes at least one signal input port, a first controller and a first optical signal transceiver. The signal input port receives video signals from at least one signal source, the first controller converts the video signals into cable television video signals and the first optical signal transceiver converts the cable television video signals into optical video signals and the optical video signals are transmitted to the optoelectronic demodulator through the optical fiber.

The optoelectronic demodulator includes a second optical signal transceiver, a second controller and at least one signal output port. The second optical signal transceiver receives the optical video signals and converts the optical video signals back to the cable television video signals, the second controller converts the cable television video signals back to the video signals, and the video signals are monitored on a display connected to the signal output port. In addition, the optoelectronic demodulator can further include another signal output port connected to a tuner and a display, or a television with an internal tuner.

The optoelectronic modulator can further include a first local adjusting port to receive local control signals to switch the channels for the cable television video signals and control the signal source, for example, a video player or a video camera. The optoelectronic modulator can further receive remote control signals from the optoelectronic demodulator through the optical fiber to switch channels for the cable television video signals and control the signal source.

The optoelectronic demodulator further includes a second local adjusting port to receive local control signals to change the video signals outputted by the signal output port and control the optoelectronic modulator with the remote control signals transmitted through the optical fiber. The optical video signals are analog optical video signals or digital optical video signals.

Hence, the optical fiber security system according to the present invention can be operated through the optical fiber even when the distance between the optoelectronic demodulator and the optoelectronic modulator is more than 10 kilometers. In addition, the optical fiber security system according to the present invention can locally or remotely control the optoelectronic modulator and the optoelectronic demodulator.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein:

FIG. 1 illustrates a preferred embodiment of an optical fiber security system according to the present invention.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

FIG. 1 illustrates a preferred embodiment of an optical fiber security system according to the present invention. The optical fiber security system includes an optoelectronic modulator 100, an optoelectronic demodulator 300 and an optical fiber 200. The optoelectronic modulator 100 is directly connected to the optical fiber 200 and the optoelectronic demodulator 300 is also directly connected to the optical fiber 200 to form a closed security system. The optoelectronic modulator 100 can receive signals from at least one signal source, such as video signals and/or audio signals from the first signal source 10, the second signal source 20 and/or the third signal source 30. In addition, the optoelectronic modulator 100 converts the video signals and/or audio signals into respective cable television channel signals according to the cable television frequency and further converts the cable television channel signals into optical signals to directly transmit the optical signals through the optical fiber 200 to the optoelectronic demodulator 300. The optoelectronic demodulator 300 then converts the optical signals back to the respective cable television channel signals according to the cable television frequency.

Subsequently, the optoelectronic demodulator 300 can output video signals of a predetermined cable television channel to at least one monitor or television, such as the first monitor 40, the second monitor 50 and/or the third monitor 60. In addition, a tuner 70 can be further disposed between the optoelectronic demodulator 300 and the third monitor 60 to change the cable television channel so as to easily monitor the video and/or audio signals transmitted from different signal sources.

The first monitor 40 or the second monitor 50 receives the video/audio signals and displays the video/audio signals thereon. Therefore, a regular display can be adopted to secure the surrounding environment. In addition, the third monitor 60 and the tuner 70 can also be replaced with a television with an internal tuner to effectively monitor signals of a plurality of channels. A video recorder or a recordable optical disc drive can replace the monitor can to store the video/audio signals therein.

The optoelectronic modulator 100 further includes a controller 140, an optoelectronic transceiver 150, and at least one signal input port, e.g. a first signal input port 110, a second signal input port 120 and/or a third signal input port 130. The first signal input port 110, the second signal input port 120 and the third signal input port 130 are respectively connected to a first signal source 10, a second signal source 20 and a third signal source 30 to get the audio/video signals there from. The controller 140 converts these signals into the respective cable television channel signals and the optoelectronic transceiver 150 further converts the cable television channel signals into the optical signals to transmit the same to the optoelectronic demodulator 300 through the optical fiber 200.

Furthermore, the optoelectronic modulator 100 preferably includes a local adjusting port 160 connected to the controller 140 to receive local control signals, such as channel control signals or signal source control signals, to alter the setting of the controller 140. In one preferred embodiment, the channel control signals can switch the cable television channels for the cable television channel signals. In another preferred embodiment, the signal source control signals can further control the electronic equipment, such as the video camera, microphone and/or video player, of signal sources. The controller 140 preferably includes a microprocessor to control the electronic equipment of the signal sources and switch the channels for the cable television channel signals. In addition, the optoelectronic modulator 100 can also be controlled by remote control signals transmitted through the optical fiber 200 from the optoelectronic demodulator 300 to control the foregoing electronic equipment of the signal sources and switch the channels for the cable television channel signals.

Furthermore, the optoelectronic demodulator 300 preferably includes a controller 340, an optoelectronic transceiver 350 and a at least one signal output port, such as a first signal output port 310, a second signal output port 320 and/or a third signal output port 330. The optoelectronic transceiver 350 converts the optical signals transmitted from the optical fiber 200 into electronic signals and the controller 340 further coverts the electronic signals into the corresponding cable television channel signals. The cable television channel signals are respectively transmitted to a first monitor 40, a second monitor 50 and a third monitor 60 through the first signal output port 310, a second signal output port 320 and a third signal output port 330.

The optoelectronic demodulator 300 further includes a local adjusting port 360 to receive local control signals to control the controller 340, the foregoing monitors and the output signals outputted by the signal output ports. In addition, the local adjusting port 360 can further remotely control the optoelectronic modulator 100 through the optical fiber 200 and the controller 340 to transmit the remote control signals to the optoelectronic modulator 100 to control the electronic equipment of the signal sources and switch the cable television channels for the cable television signals.

Hence, the optical fiber security system according to the present invention can locally or remotely change the cable television channels for the optoelectronic modulator 100 and control the electronic equipment of the signal sources connected to the optoelectronic modulator 100. In the same manner, the optical fiber security system according to the present invention can locally or remotely change the cable television output channels for the optoelectronic modulator 300 and control the electronic equipment connected to the signal output ports of the optoelectronic modulator 300. With the optical fiber, the optical fiber security system according to the present invention can effectively improve the quality and extend the transmission distance for the security signals. Compared with the conventional security system using the coaxial cable, the optical fiber security system according to the present invention can save a lot of amplifiers, the signals can be transmitted more than 10 kilometers without any amplifier, so as to effectively improve the security quality and range. In addition, the optical fiber security system according to the present invention adopts a closed optical fiber system so that the optical fiber security system can effectively prevent downgraded video quality caused by the traffic jams and signal delays in the public network. Therefore, the optical fiber security system according to the present invention using the closed optical fiber network system can further improve the security quality thereof.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. An optical fiber security system, comprising:
   an optical fiber;
   an optoelectronic modulator directly connected to the optical fiber, the optoelectronic modulator comprising:
   at least one signal input port to receive security video signals from at least one signal source;
   a first controller connected to the signal input port to convert the security video signals into cable television video signals; and
   a first optical signal transceiver connected between the first controller and the optical fiber to convert the cable television video signals into optical video signals; and
   an optoelectronic demodulator directly connected to the optical fiber, wherein the optoelectronic demodulator comprising:
   a second optical signal transceiver directly connected to the optical fiber to receive the optical video signals and convert the optical video signals back to the cable television video signals;

a second controller connected to the second optical signal transceiver to convert the cable television video signals back to the security video signals; and at least one signal output port connected to the second controller and at least one first monitor to monitor the security video signals; and a first local adjusting port connected to the first controller to receive local control signals, wherein the local control signals comprise channel control signals to change channels for the cable television video signals.

2. The optical fiber security system of claim 1, wherein the optoelectronic demodulator further comprises a second signal output port to connect to a tuner and a second monitor.

3. The optical fiber security system of claim 1, wherein the optoelectronic demodulator further comprises a second signal output port to connect to a television with a tuner inside.

4. The optical fiber security system of claim 1, wherein the local control signals comprise signal source control signals to control the signal source.

5. The optical fiber security system of claim 4, wherein the signal source is a video player or a video camera.

6. The optical fiber security system of claim 1, wherein the optoelectronic modulator further receives remote control signals from the optoelectronic demodulator through the optical fiber.

7. The optical fiber security system of claim 6, wherein the remote control signals comprise remote channel control signals to change channels for the cable television video signals.

8. The optical fiber security system of claim 7, wherein the remote control signals comprise remote signal source control signals to control the signal source.

9. The optical fiber security system of claim 1, wherein the optoelectronic demodulator further comprises a second local adjusting port connected to the second controller to receive local control signals.

10. The optical fiber security system of claim 9, wherein the local control signals comprise channel control signals to change the security video signals outputted by the first signal output port.

11. The optical fiber security system of claim 9, wherein the second local adjusting port receives remote control signals and transmits the remote control signals to the optoelectronic modulator through the optical fiber to control the optoelectronic modulator.

12. The optical fiber security system of claim 1, wherein the optical video signals are analog optical video signals.

13. The optical fiber security system of claim 1, wherein the optical video signals are digital optical video signals.

14. The optical fiber security system of claim 1, wherein a distance between the optoelectronic modulator and the optoelectronic demodulator is more than 10 kilometers and the optical video signals are transmitted from the optoelectronic modulator to the optoelectronic demodulator only through the optical fiber.

* * * * *